United States Patent [19]

Shimizu et al.

[11] Patent Number: 4,517,727

[45] Date of Patent: May 21, 1985

[54] METHOD OF PRODUCING A POROUS BODY FOR ELECTROLYTIC CAPACITOR HAVING A LEAD WIRE

[75] Inventors: Shigeaki Shimizu; Yoshimi Kubo; Yoshio Arai; Tetsuo Suzuki; Hitoshi Igarashi, all of Tokyo, Japan

[73] Assignee: NEC Corporation, Tokyo, Japan

[21] Appl. No.: 509,153

[22] Filed: Jun. 28, 1983

[30] Foreign Application Priority Data

Jun. 28, 1982 [JP] Japan ................................. 57-111102

[51] Int. Cl.[3] .......................... H01G 9/04; H01G 9/05
[52] U.S. Cl. ...................................... 29/570; 361/433; 419/2
[58] Field of Search ............... 29/570; 361/433; 419/2

[56] References Cited

U.S. PATENT DOCUMENTS 3,599,053 8/1971 Iida et al. ........................... 29/570 X
4,331,477 5/1982 Kubo et al. ........................... 75/228

Primary Examiner—Brian E. Hearn
Assistant Examiner—Alan E. Schiavelli
Attorney, Agent, or Firm—Laff, Whitesel, Conte & Saret

[57] ABSTRACT

A porous sintered body for an aluminum-titanium alloy electrolytic capacitor has a wire of nitrogenized titanium, or the like, implanted therein. A method of producing such a porous body subjects a titanium wire to a nitriding treatment, and embeds the nitrogenized Ti wire into a press-molded body of the mixture of aluminum and either titanium or titanium hydride powders. Then, the press-molded body is sintered. An excellent LC characteristic is obtained even under the sintering condition, and the aluminum-titanium electrolytic capacitor is devoid of bent lead wires.

8 Claims, No Drawings

METHOD OF PRODUCING A POROUS BODY FOR ELECTROLYTIC CAPACITOR HAVING A LEAD WIRE

BACKGROUND OF THE INVENTION

This invention relates to a porous body for an electrolytic capacitor into which lead wires are implanted, and to a method of producing the same. More particularly, the present invention relates to an aluminum-titanium alloy electrolytic capacitor and to a method of producing the same.

So-called valve metals, such as tantalum, niobium, zirconium, vanadium, hafnium, titanium and aluminum are known as anode materials for an electrolytic capacitor. Conventionally, intensive studies have been made to examine the fundamental characteristics of these metals for use as an electrolytic capacitor in the form of either a single substance or an alloy and to put them into practical application.

In order to put these metals into a practical application as the capacitor, however, the leakage current, dielectric loss, and the like, of the oxide films must reach predetermined levels. For this reason, only tantalum and aluminum have been put into practical applications at present as the anode metals of the capacitor.

The capacitor using tantalum as the anode material has the advantages that its electric characteristics such as the leakage current and dielectric loss are excellent, it is electrically stable, has exttremely high reliability, is small in size, but it still provides a high capacity. However, supply cannot follow the demand of tantalum in recent years due to its limited resources, and the price is soaring, thereby raising the production cost of the capacitor.

The capacitor using aluminum as the anode material is less expensive, but it involves the poblem that both miniaturization and increase of capacity are difficult to attain simultaneously. Moreover, the electric characteristics and stability of the capacitor using aluminum are inferior to those of the capacitor using tantalum as the anode material.

Under the circumstances described above, the art has long sought to develop an electrolytic capacitor using, as the anode, those materials which have excellent electric characteristics such as low leakage current and dielectric loss, and excellent reliability, and which can be supplied stably and economically. As a result of intensive studies, the inventors found that these requirements can be satisfied by a porous sintered body for an electrolytic capacitor using an aluminum-titanium alloy as the anode material. Such porous Al-Ti alloy is disclosed in U.S. Pat. No. 4,331,477 which was issued and assigned to the assignee of the present invention on May 25, 1982.

A porous Al-Ti alloy body can be obtained by the following steps, for example. First, mix aluminum and either titanium or titanium hydride (TiH2) in the form of powder in the micron order. The mixed powder is then press-molded with a lead wire embedded in it. The mold is sintered at a vacuum of $1 \times 10^{-6}$ mmHg at a temperature of 1,000° to 1,100° C. for 1 to 3 hours, to obtain an alloy porous sintered body. The (Al-Ti) alloy reaction occurs during sintering and aluminum is exclusively diffused into and absorbed by titanium, so that the portions where aluminum has been previously present become and remain porous, thereby providing the alloy porous body.

The Al-Ti alloy having the excellent capacitor characteristics also has the characterizing feature that a porous body having a large specific surface area can be obtained easily. This characterizing feature results from the fact that the alloying reaction between Al and Ti has a high unidirectionality of diffusion of Al into Ti.

The reaction sintering process of the Al-Ti or Al-TiH2 mixed powder utilizes the peculiarity of this alloying reaction. The skeleton structure and specific surface area of the porous body in this case are fundamentally determined by the particle size distribution of the Ti or TiH2 powder and the porous structure, and by the particle size distribution of the Al powder.

In such an Al-Ti porous body, the specific surface area of approximately 1 $m^2/cm^3$, which corresponds to CV/volume of 75,000 $\mu F \cdot V/cm^3$, can be obtained easily. Hence, this porous body is extremely advantageous for obtaining an electrolytic capacitor which is small in size, but which has a large capacitance.

This novel solid electrolytic capacitor is indeed revolutionary in that it has the characterizing features of a tantalum electrolytic capacitor (such as a small size) and a large capacitance, and the characteristic features of an aluminum electrolytic capacitor (such as low cost).

The problem of incorporating a lead wire is serious for the Al-Ti capacitor, because the Al-Ti alloy which is approximate to the composition of the porous body is extremely brittle, which is the characterizing feature inherent to intermetallic compounds. Thus, it is extremely difficult to prepare a wire from the alloy. For this reason, the same material that is used to make the porous body cannot also be used to make the lead wire. This is unlike tantalum, which may be used to make both a capacitor and the lead wire. It is, therefore, of the utmost importance to find other materials of the lead wire that can substitute for the Al-Ti alloy.

However, the material of the lead wire for the Al-Ti capacitor must have the anodization characteristics which are at least compatible with the anodization of the Al-Ti alloy, and the material must be sufficiently economical. In order to use the material as the embedded lead wire, the material must be resistant to the baking and sintering temperatures and must also have good sinterability with the porous body.

In the light of these requirements, Al and Ta that have been used as the material for the electrolytic capacitor are not suitable, because the melting point of Al is too low and Ta is too expensive. Having a high melting point, Ta has low sinterability. Other valve metals are mostly expensive and their formation characteristics are not very satisfactory.

Accordingly, the inventors of the present invention have realized a lead wire, which is substantially homogeneous to the porous body, by alloying the surface of titanium, which is one of the constituent elements of the Al-Ti alloy and is relatively economical, with aluminum.

Various methods may be used to alloy the surface of the Ti wire but the most simple method is to alloy the Ti surface by the Al vapor generated from the porous body, during sintering.

Accordingly, if suitable conditions are selected, it is expected that the surface of the Ti wire can be sufficiently alloyed during heat-treatment.

However, the following problems were found when the Ti wire was used.

First, when the Al-Ti mixed powder composition of the press-molded article is not Al-rich, that is, when the Al content is below about 51 atom % and/or when the sintering temperature is low, the Al vapor becomes insufficient and the wire surface composition of the portion embedded into the sintered body becomes Al-poor, so that the Ti wire surface is not sufficiently alloyed. Under such a state, the formation characteristics, such as a leakage current (LC), deteriorate severely.

Second, a bending deformation of the Ti lead wire is liable to occur at the wire portion outside the sintered body, after sintering. This problem of wire bending is serious when the material is put on an automatic mass-production line. By all means, this problem must be solved.

SUMMARY OF THE INVENTION

It is, therefore, an object of the present invention to provide a porous body for an aluminum-titanium alloy electrolytic capacitor in which inexpensive and under-formed lead wire is implanted.

Especially in accordance with the present invention, there is provided a porous sintered body for an aluminum-titanium alloy electrolytic capacitor, in which a nitrogenized titanium wire is implanted. The surface of the wire is converted into Al-Ti alloy.

In accordance with the present invention, there is also a method of producing a porous body for an electrolytic capacitor. The method comprises a process of subjecting a titanium wire to nitriding treatment, a process of embedding the nitrogenized Ti wire into a press-molded body of the mixture of aluminum and either titanium or titanium hydride powders, and a process of sintering the resulting press-molded body.

In the present invention, since a titanium wire, subjected to nitriding treatment, is used as the lead wire to be embedded and press-molded, an excellent LC characteristics can be obtained even under the sintering condition in which the aluminum vapor is relatively poor during sintering. A method produces the porous anode body for an aluminum-titanium electrolytic capacitor, devoid of any bending of lead wire. The more excellent LC characteristics can be obtained, for some reason or other, by using the titanium wire subjected to nitriding treatment. The nitriding treatment gives better results than pure titanium gives. The reason why the better LC characteristics can be obtained and why bending deformation of the wire does not occur may be assumed as follows.

The bending deformation of the wire occurs because titanium has a transformation point at about 880° C. where the changes from $\alpha$ (hexagonal lattice) phase to $\beta$ (body centered cubic lattice) phase and vice versa exists. In the $\beta$ phase, at a sintering temperature (at least 1,000° C.), crystal growth and creep deformation are believed to easily occur.

In the case of the titanium wire which is subjected to nitriding treatment, on the other hand, both the $\alpha$-$\beta$ transformation temperature and the melting point shift to the higher temperatures. (If nitrogen is added in an amount of 6 atom % or 9 atom % in the form of a solid solution, the trasnformation point becomes 1,100° C. or 1,300° C.). It is thus assumed that transformation does not occur at the sintering temperature (1,000° to 1,100° C.). However, the wire remains in the low temperature (normal temperature) phase, that is, the $\alpha$ phase, and bending deformation is difficult to occur, which is also due to the fact that the wire iself is hardened by nitriding treatment.

By heat-treating a pure Ti wire in a nitrogen atmosphere, the wire surface is converted into a titanium nitride layer. When the press-molded body is heat-treated at a high temperature which is more than 1000° C., after mounting the wire into the press-molded body during pressing, the surface of the wire is converted to the equilibrium composition, i.e., that of the Al-Ti porous body, the conversion occurring by virtue of A vapor. The role of the titanium nitride layer is to suppress the diffusion of aluminum into the center of the wire and, thus, to establish quickly a chemical equilibrium between the porous body and the wire surface.

In other words, the Al component stays in the proximity of the wire surface inside the sintered body even in such a state that the Al vapor is insufficient which state occurs when the mixed powder composition of the press-molded article is titanium-rich or when the sintering temperature is relatively low, because nitrogen in titanium produces a barrier effect against the aluminum diffusion. Accordingly, the surface composition is not insufficient and the satisfactory LC characteristics can be obtained.

In fact, when the cross section of the wire portion, in the radial direction, embedded into the sintered body having 51 atom % Al was analyzed by an X-ray microanalyzer, it was found that the aluminum component was diffused and distributed considerably deeper from the surface portion and into the center of a pure titanium wire having a 0.3 mm diameter. The surface portion was found to have a composition containing about 5 atom % Al. In the case of the titanium wire subjected to nitriding treatment, on the other hand, the surface portion of the wire down to about 10 $\mu$m from the surface was found to contain 40 to 50 atom % Al and to have been sufficiently alloyed. It was also found that Al was hardly distributed further inside.

The reason may be assumed as follows. If the nitriding treatment is not effected, the Al atoms that have been carried onto the wire surface in the vapor phase are sequentially diffused into the wire, and the Al concentration on the wire surface stays in a low value. If the Ti wire is subjected to the nitriding treatment, on the other hand, the titanium nitride layer formed on the wire surface serves as a kind of barrier against Al diffusion and prevents the Al atoms carried by the vapor phase from being diffused into the wire. Hence, Al is built up to the wire surface.

If the nitriding treatment is not carried out, the lead wire surface is considerably Ti-rich, so that the formation characteristics become extremely deteriorated, to an extent that there may be 10 to 100 nA/ $\mu$F·V of leakage current, for example. In the case of the Ti wire subjected to nitriding treatment, on the other hand, the leakage current is as low as about 0.5 nA/ $\mu$F·V.

The result described above clearly illustrates that nitrogen in titanium has the barrier effect against the Al diffusion.

Nitriding treatment of the Ti wire is carried out in the nitrogen gas at a temperature of 1,000° C. to 1,300° C. for a period of about ten minutes to ten seconds, and the wire surface becomes a golden color, which may result from the TiN phase. This surface layer is insoluble in hydrofluoric acid at normal temperature. Peaks which may result from TiN and $Ti_2N$ appear in the observation by means of X-ray diffraction. Sinterability of the nitrogenized Ti wire with the porous body is compatible to that of the Ti wire and can be regarded as sufficient.

The core portion of the Ti wire is not always converted into titanium nitride by nitriding treatment, but the effect explained above is sufficient so long as a titanium nitride layer having a thickness more than one micron is established from the outer wire surface into the wire, in a predetermined distance, even though the wire center remains in the state of pure titanium.

DETAILED DESCRIPTION OF PREFERRED EMBODIMENTS

Hereinafter, the present invention will be described in further detail with reference to Example thereof.

EXAMPLE

Titanium hydride powder and aluminum powder were mixed to prepare two compositions having the Al content of 54 at % and 51 at %, respectively. A nitrogenized titanium wire and a pure titanium wire were prepared, the latter being for the sake of comparison of characteristics.

The nitrogenized titanium wire was prepared in the following manner.

Nitrogen gas was caused to flow through an electric furnace having an equalizing temperature range of about 100 cm. The titanium wires were conveyed at a feed speed of about 200 cm/min to carry out a continuous nitriding treatment. Both pure titanium wire and nitrogenized titanium wire had a diameter of about 0.3 mm.

The two kinds of wires were embedded into the two kinds of mixed powder as the lead wires and were press-molded at a pressure of 2 tons/cm². Press-molded samples of four kinds were thus prepared. The amount of the mixed powder per press-molded article was 40 mg.

A vessel equipped with a lid having a size of 10 cm × 10 cm × 5 cm was produced using a tantalum plate, as a sintering vessel. The vessel equipped with the lid used in order to increase the concentration of the Al vapor in the proximity of the samples (i.e., the press-molded articles using the nitrogenized titanium wires or pure titanium wire as the lead wires).

The press-molded articles of the four kinds were separately placed in this sintering vessel and wire sintered at a reduced pressure of $1 \times 10^{-6}$ mmHg. The number of press-molded articles of each kind to be placed in the sintering vessel was 200 pieces in one group and 1,000 pieces in the other group. The sintering was carried out for the respective groups at sintering temperatures of 1,000° C. and 1,050° C. Thus, 16 kinds in total of porous sintered bodies were prepared.

Each of fifty specimens were picked up from the sintered bodies of each kind, as the samples. Afterward, an anodization of 80 V was effected in an aqueous phosphoric acid solution. A dielectric capacity at 120 Hz and a leakage current at the application of 16 V were measured.

The mean value of the fifty samples of each kind was calculated with the results shown in Table 1. In Table 1, marks were put on the right adjacent column of the leakage current column to illustrate the acceptance or rejection of the leakage current value.

Mark O represents the accepted value; mark X means the rejected value; and mark Δ means the intermediate level between the acceptance and rejection.

TABLE 1

| Powder composition | Number of press-molded articles | Sintering temperature | Pure Ti wire dielectric capacity (μF) | Pure Ti wire leakage current (μA) | | Nitrogenized Ti Wire dielectric capacity (μF) | Nitrogenized Ti Wire leakage current (μA) | |
|---|---|---|---|---|---|---|---|---|
| 54 atom % Al | 200 | 1000° C. | 13.6 | 0.282 | Δ | 13.7 | 0.052 | O |
| | | 1050° C. | 12.2 | 0.064 | O | 12.3 | 0.048 | O |
| | 1000 | 1000° C. | 13.7 | 0.061 | O | 13.6 | 0.043 | O |
| | | 1050° C. | 12.1 | 0.048 | O | 12.2 | 0.041 | O |
| 51 atom % Al | 200 | 1000° C. | 14.5 | 2.58 | X | 14.5 | 0.058 | O |
| | | 1050° C. | 12.9 | 1.98 | X | 12.9 | 0.047 | O |
| | 1000 | 1000° C. | 14.6 | 0.374 | Δ | 14.4 | 0.049 | O |
| | | 1050° C. | 12.8 | 0.293 | Δ | 12.9 | 0.046 | O |
| state of wire bending after sintering | | | wire bending: existed (approx. 70% or more) | | | wire bending: not existed | | |

The following can be understood from the results tabulated in Table 1.

When the pure titanium wire was used, good leakage current (LC) characteristics could be obtained if the number of samples sintered simultaneously was large or if the sintering temperature was high, provided that the mixed composition had the Al content of 54 atom %. However, the good LC characteristics could not be obtained if the number of samples was small and the sintering temperature was low. When the mixed composition had the Al content of 51 atom %, the good LC characteristics could not be obtained at all if the number of sintering samples was small or the sintering temperature was low. Somehow, an improved LC characteristics could be obtained only if the number of samples was great and the sintering temperature was high. In the case of the nitrogenized titanium wire, on the other hand, the good LC characteristics could be obtained in all cases, regardless of the difference of the mixed compositions, the numbers of sintering samples and the sintering temperatures. As to a bending of the wire after sintering, about 70% or more of the wires underwent a bending deformation in the case of the pure titanium wire, whereas the bending deformation did not occur at all in the case of the nitrogenized titanium wire (see the bottom of Table 1).

As described above, the present invention can solve the essential and critical problem of the lead wire for an alloy capacitor by using the relatively economical material, that is, nitrogenized Ti wire, and alloying the surface of the Ti wire by the Al vapor generated from the porous body at the time of sintering. Accordingly, the present invention can provide alloy capacitors having substantially the compositional homogeneity over the porous body and its lead wire. In view of LC characteristics, it seems favorable that the Al-Ti surface layer of the wire has the composition range of 30 to 70 atom % of aluminum. More favorably, the composition ranges from 40 to 60 atom % of aluminum. It was hard to detect the composition of nitrogen in the Al-Ti alloy surface of the wire. It is believed that the nitrogen may be diffused into the center portion of the wire at the sintering process.

It is desirable to decide the optimum composition of Al-Ti alloy porous body in accordance with the properties evaluated in the form of a capacitor. Porous bodies with a series of compositions were made by heat-treating press-molded bodies, which have the size of 2 mm in diameter and 2.5 mm in height, at 1,070° C. for three hours. They were anodized at forming voltage ($V_f$) of 80 V by using a 0.05 volume % $H_3PO_4$ solution. A manganese dioxide ($MnO_2$) electrode was formed by thermal decomposition of manganese nitrate which was essentially the same as the process for tantalum capacitors. After the $MnO_2$ electrode formation, graphite and silver-paste layers were formed on the $MnO_2$ layer. Then leakage current (LC) and tan δ (at 120 Hz) were evaluated. The LC measurements showed that in the composition range of 54 to 60 atom % of aluminum, the LC characteristic was excellent. However, in the composition range which is larger than 65 atom % of aluminum, the $MnO_2$ electrode formation seemed to degrade the quality of films severely and resulted in an increase of LC value. As for tan δ which includes the dielectric loss of the film (tan $δ_f$) and the contribution from the equivalent series resistance (ESR) of the $MnO_2$ electrode, there was a relatively low value for the composition of 54 atom % or more of aluminum, neither tan δ nor LC values were adaptable to the actual capacitor.

Thus, a porous body made of 54 to 60 atom % of aluminum compositions are favorable as a capacitor anode. Furthermore, the consideration on the specific surface area prefers the compositions around 54 to 55 atom % of aluminum. Therefore, the optimum composition to manufacture capacitors is concluded to be about 54 to 55 atom % of aluminum.

In order to examine the capability of Al-Ti alloy porous anodes embody a highly miniaturized solid electrolytic capacitor, a series of capacitors, of different sizes, was manufactured. The powders used were those of titanium hydride (about two microns in particle diameter) and aluminum (about 3.9 microns in particle diameter). The composition was 54 atom % of aluminum. The powder mixture was press-molded into three different shapes; A, B and C, that is, A has 1.6 mm in diameter and 2.1 mm in height, B has 2.5 mm in diameter and 2.1 mm in height, and C has 3.5 mm in diameter and 2.1 mm in height.

A titanium wire (0.3 mm in diameter) was subjected to a nitriding treatment and was mounted into each of the press-molded bodies during pressing. These press-molded bodies were heat-treated at 1,050° C. for one hour and anodized. All heat-treatments of press-molded bodies were done in a vacuum of $1 \times 10^{-6}$ mmHg. A dehydrogenization stage was introduced at a temperature range of 400° to 500° C. prior to the final heat-treatment. The anodization voltages ($V_f$) were 80 V for the anode A, 64 V for the anode B, and 60 V for the anode C. After the $MnO_2$ formation and other required process were applied, these molded bodies were epoxy-sealed.

The electro-static capacitance measurements resulted in the values of 4.7 μF (for A), 0 μF (for B) and 22 μF (for C). The dielectric losses, tan δ (at 120 Hz), were found to be 4 to 6% while the values of LC evaluated at a working voltage ($V_W$) of 16 T were about 1 NA/μF·V, on average, for all sizes of capacitors which were sufficiently small for the actual application. As for the $CV_f$/volume values, they were calaculated as about 65,000 to 70,000 μF·V/cm³. In order to make an absolute evaluation of capacitor sizes, one should rather calculate the value, $CV_w$/(capacitor volume). Defining the working voltage of these capacitors as $V_w = 16$ V, one obtains as the values of $CV_w$/(capacitor volume); 2.1, 2.5 and 3.6 μF·V/mm³ for A, B and C, respectively. These values are comparable to those of tantalum capacitors.

What is claimed is:

1. A method for producing a porous sintered body for an Al-Ti solid electrolytic capacitor equipped with a lead wire, comprising steps of subjecting a titanium wire to a nitriding treatment, embedding said wire into a mixture of aluminum powder and titanium powder, press-molding the mixtureof said powders with said wire, an sintering the resulting press-molded article.

2. A method for producing an Al-Ti alloy solid electrolytic capacitor comprising the steps of mixing aluminum powder and titanium powder, subjecting a titanium wire to a nitriding treatment, press-molding the mixture of said powders with a part of said wire, sintering the resulting press-molded article in aluminum-vapor atmosphere thereby forming a porous Al-Ti alloy body while forming an Al-Ti alloy region into the surface of said wire, anodizing the resulting sintered article to form a dielectric layer onto said sintered article, and forming cathode layers onto said dielectric layer formed on said porous Al-Ti alloy body.

3. A method for producing an Al-Ti alloy solid electrolytic capacitor as claimed in claim 2, in which said aluminum-vapor is generated from said porous Al-Ti alloy body at the time of said sintering process.

4. A method for producing an Al-Ti alloy solid electrolytic capacitor as claimed in claim 2, in which said wire is prepared by heating a pure titanium wire in a nitrogen atmosphere for converting the surface of said titanium wire into a titanium nitride layer, and diffusing aluminum into said titanium nitride layer by heating said wire in aluminum-vapor atmosphere, said aluminum-vapor being generated from said porous Al-Ti alloy body at the time of said sintering step, thereby forming an Al-Ti alloy layer into said titanium nitride layer, said Al-Ti alloy layer having a composition containing 30 to 70 atom % of aluminum.

5. A method for producing an Al-Ti alloy solid electrolytic capacitor comprising the steps of heating a titanium wire in a nitrogen atmosphere at a temperature in the range of substantially 1,000° C. to 1,300° C. for converting the wire surface into a titanium nitride layer, mixing aluminum powder and titanium powder, press-molding the mixture of said powders into a body while embedding a part of said wire into said body, heating the resulting press-molded article in an aluminum-vapor atmosphere for converting said body into a porous Al-Ti alloy body while converting the wire surface into a Al-Ti alloy layer, said aluminum-vapor being generated from said porous Al-Ti alloy body at the time of said heating process, anodizing the resulting heat-treated article in an aqueous phosphoric acid solution for forming a dielectric layer onto said porous Al-Ti alloy body, forming a manganese dioxide layer onto said dielectric layer, and forming a cathode electrode layer onto said manganese dioxide layer.

6. A method for producing a porous sintered body for an Al-Ti solid electrolytic capacitor equipped with a lead wire, comprising steps of subjecting a titanium wire to a nitriding treatment, embedding said wire into a mixture of aluminum powder and titanium hydride powder, press-molding the mixture of said powders with said wire, and sintering the resulting press-molded article.

7. A method for producing an Al-Ti alloy solid electrolytic capacitor comprising the steps of mixing aluminum powder and titanium hydride powder, subjecting a titanium wire to a nitriding treatment, press-molding the mixture of said powders with a part of said wire, sintering the resulting press-molded article in aluminum-vapor atmosphere thereby forming a porous Al-Ti alloy body while forming an Al-Ti alloy region into the surface of said wire, anodizing the resulting sintered article to form a dielectric layer onto said sintered article, and forming cathode layers onto said dielectric layer formed on said porous Al-Ti alloy body.

8. A method for producing an Al-Ti alloy solid electrolytic capacitor comprising the steps of heating a titanium wire in a nitrogen atmosphere at a temperature in the range of substantially 1,000° C. to 1,300° C. for converting the wire surface into a titanium nitride layer, mixing aluminum powder and titanium hydride powder, press-molding the mixture of said powders into a body while embedding a part of said wire into said body, heating the resulting press-molded article in an aluminum-vapor atmosphere for converting said body into a porous Al-Ti alloy body while converting the wire surface into a Al-Ti alloy layer, said aluminum-vapor being generated from said porous Al-Ti alloy body at the time of said heating process, anodizing the resulting heat-treated article in an aqueous phosphoric acid solution for forming a dielectric layer onto said porous Al-Ti alloy body, forming a manganese dioxide layer onto said dielectric layer, and forming a cathode electrode layer onto said manganese dioxide layer.

* * * * *